US010698695B2

(12) United States Patent
Guo

(10) Patent No.: US 10,698,695 B2
(45) Date of Patent: Jun. 30, 2020

(54) METHOD FOR INTEL PLATFORM DETECTION OF PARAMETERS IN FLASH ROM

(71) Applicant: INSPUR ELECTRONIC INFORMATION INDUSTRY CO., LTD., Jinan, Shandong (CN)

(72) Inventor: Zhangping Guo, Shandong (CN)

(73) Assignee: INSPUR ELECTRONIC INFORMATION INDUSTRY CO., LTD., Jinan, Shandong (CN)

( * ) Notice: Subject to any disclaimer, the term of this patent is extended or adjusted under 35 U.S.C. 154(b) by 83 days.

(21) Appl. No.: 16/097,133

(22) PCT Filed: Jul. 20, 2017

(86) PCT No.: PCT/CN2017/093686
§ 371 (c)(1),
(2) Date: Oct. 26, 2018

(87) PCT Pub. No.: WO2018/028410
PCT Pub. Date: Feb. 15, 2018

(65) Prior Publication Data
US 2019/0095219 A1 Mar. 28, 2019

(30) Foreign Application Priority Data
Aug. 9, 2016 (CN) .......................... 2016 1 0645910

(51) Int. Cl.
*G06F 9/44* (2018.01)
*G06F 9/4401* (2018.01)
*G06F 9/30* (2018.01)

(52) U.S. Cl.
CPC ........ *G06F 9/4406* (2013.01); *G06F 9/30101* (2013.01)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS 9,778,936 B1 * 10/2017 Righi .................... G06F 9/4401
10,360,115 B2 * 7/2019 Tanaka ................ G06F 11/1616
(Continued)

FOREIGN PATENT DOCUMENTS

CN   1776619 A    5/2006
CN   103150208 A  6/2013
(Continued)

OTHER PUBLICATIONS

International Search Report for PCT/CN2017/093686 dated Oct. 18, 2017, ISA/CN.

*Primary Examiner* — Zahid Choudhury
(74) *Attorney, Agent, or Firm* — Yue (Robert) Xu; Apex Attorneys at Law, LLP

(57) ABSTRACT

A method for Intel platform detection of parameters in a flash ROM, relating to the technical field of servers: before OPMENU and OPTYPE registers are locked in a PEI state, storing the data in an SFDP table in a HOB, and then storing the data in a memory of an EfiACPIMemoryNVS type in a DXE stage; the data can be acquired by means of invoking driving on the application layer; the acquisition of various flash ROM parameters is more convenient, facilitating checking whether the parameters are the same as those written in the program; product performance and product stability are increased, and the occurrence of bugs is reduced.

3 Claims, 1 Drawing Sheet

(58) Field of Classification Search
CPC ............. G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 2004/0158828 | A1* | 8/2004 | Zimmer | G06F 9/4401 |
| | | | | 717/168 |
| 2004/0243534 | A1* | 12/2004 | Culter | G06F 9/4411 |
| 2005/0210222 | A1* | 9/2005 | Liu | G06F 9/4403 |
| | | | | 712/220 |
| 2006/0212693 | A1* | 9/2006 | Cho | G06F 9/4403 |
| | | | | 713/1 |
| 2007/0055856 | A1* | 3/2007 | Zimmer | G06F 9/4403 |
| | | | | 713/2 |
| 2008/0082735 | A1* | 4/2008 | Shiga | G06F 13/28 |
| | | | | 711/103 |
| 2008/0155247 | A1* | 6/2008 | Zimmer | G06F 12/1408 |
| | | | | 713/2 |
| 2010/0042821 | A1* | 2/2010 | Harmer | G06F 9/4411 |
| | | | | 713/2 |
| 2013/0290778 | A1* | 10/2013 | Soderlund | G06F 11/1417 |
| | | | | 714/15 |
| 2014/0052403 | A1 | 2/2014 | Tang | |
| 2018/0341497 | A1* | 11/2018 | Perez Guevara | G06F 9/4403 |

FOREIGN PATENT DOCUMENTS

| | | |
|---|---|---|
| CN | 105512571 A | 4/2016 |
| CN | 105589716 A | 5/2016 |
| CN | 106293620 A | 1/2017 |

\* cited by examiner

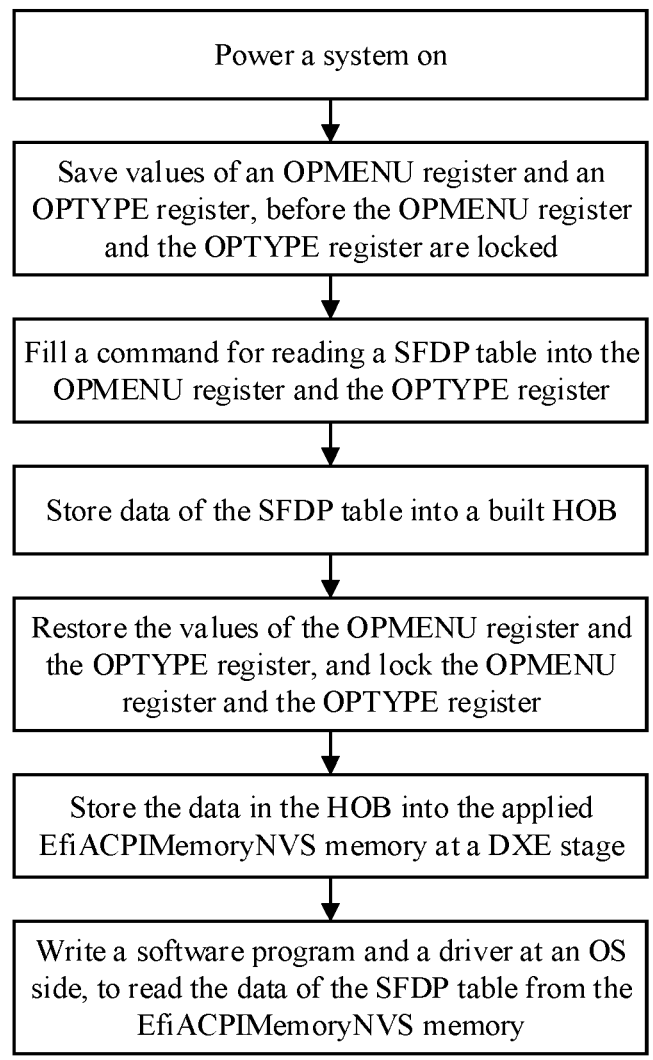

METHOD FOR INTEL PLATFORM DETECTION OF PARAMETERS IN FLASH ROM

The present application is the national phase of International Patent Application No. PCT/CN2017/093686 filed on Jul. 20, 2017, which claims priority to Chinese Patent Application No. 201610645910.4, titled "METHOD FOR INTEL PLATFORM DETECTION OF PARAMETERS IN FLASH ROM", filed on Aug. 9, 2016 with the Chinese Patent Office, both of which are incorporated herein by reference in their entireties.

FIELD

The present disclosure relates to the technical field of servers, and in particular, to a method for acquiring a parameter in a Flash Rom in an Intel platform.

BACKGROUND

In design of a PC and a server, a BIOS program is generally stored in a Flash Rom, and many parameters in the Flash Rom are required in a source code. At present, normally a specification provided by a ROM manufacturer is used to retrieve the required parameters to be added into programs. An error of the parameters may cause a crash of a system in a post process, or cause a probability of crash. But generally it is difficult to discover a problem caused by incorrect configuration of the FLASH ROM parameters. In order to facilitate check on the parameters of the Flash Rom, it is necessary to design a method to read these parameters. Detailed parameters of the Flash Rom are stored in a SFDP Table thereof, and any required parameters can be found in the SFDP Table.

It is not required to access the SFDP table for just reading an ID or a size of the Flash Rom. But the detailed parameters in the Flash Rom and supported functions thereof can be acquired only by reading the SFDP Table. An Intel platform has some restrictions on accessing the Flash Rom, that is, any accessing commands can only be used after being stored in an OPMENU register and an OPTYPE register. For example, a command to read the SFDP table is 0x5A. In a case that this command is not in the OPMEUN register, the SFDP cannot be read. In fact, 0x5A is not in the OPMENU register by default, and the two registers are locked at a PEI stage. Therefore, the SFDP table cannot be read after the system is started.

TECHNICAL ISSUE

In view of development requirement and deficiency of conventional technology, a method for acquiring a parameter in a Flash Rom in an Intel platform or an ARM platform is provided according to the present disclosure.

SOLUTION TO PROBLEM

Technical Solution

The method for acquiring a parameter in a Flash Rom in an Intel platform according to the present disclosure addresses the above technical issue by adopting the following technical solution. Main steps of the technical solution includes: 1) saving, at a PEI stage in booting and before an OPMENU register and an OPTYPE registers are locked, values of the OPMENU register and the OPTYPE register; 2) filling a command 0x5A for reading a SFDP table into the OPMENU register and the OPTYPE register; 3) storing data of the SFDP table in a built HOB; 4) storing, at a DXE stage, data in the HOB into an applied EfiACPIMemoryNVS memory; and 5) reading, by calling a driver in a system, the data from the EfiACPIMemoryNVS memory.

Preferably, after storing the data of the SFDP table in the built HOB, the values of the OPMENU register and the OPTYPE register are restored, and the OPMENU register and the OPTYPE register are locked.

Preferably, a software program and the driver are written at an OS side, and the driver is called to acquire the data of the SFDP table at an application layer.

BENEFICIAL EFFECT OF SOLUTION

Beneficial Effect

In comparison with the conventional technology, the method for acquiring a parameter in a Flash Rom in an Intel platform according to the present disclosure has following beneficial effects. According to the present disclosure, the data in the SFDP table is stored in the HOB (hand off block) before the OPMENU register and the OPTYPE register are locked at the PEI stage, and then the data is stored in the EfiACPIMemoryNVS type of memory in the DXE stage. The data can be acquired at the application layer by calling the driver. Therefore, it is convenient to acquire the parameters in the Flash Rom, so as to check whether the parameters are consistent with parameters filled in the program. Therefore, product functions can be increased, an occurrence rate of bugs is reduced, and product stability is improved. All kinds of servers or memories can implement the method by cooperation between upper-layer software codes of a BIOS and an OS, without adding any hardware circuitry.

BRIEF DESCRIPTION OF THE DRAWINGS

Drawing Description

FIG. 1 is a flow chart of a method for acquiring a parameter in a Flash Rom in an Intel platform.

DETAILED DESCRIPTION

Embodiments

In order to make objectives, technical solutions and advantages of the present disclosure more clear, hereinafter a method for acquiring a parameter in a Flash Rom in an Intel platform according to the present disclosure is further described in details in conjunction with specific embodiments.

In order to facilitate acquiring various parameters in a Flash Rom, a method for acquiring a parameter in the Flash Rom in an Intel platform is provided according to the present disclosure. The method is implemented by some bios codes. Data in a SFDP table is stored in a HOB (hand off block) before the OPMENU register and the OPTYPE register are locked, and the data is stored in an EfiACPIMemoryNVS type of memory at a DXE stage, so that the data can be acquired at an application layer by calling a driver in a system.

Embodiment

When a system is powered on, the UEFI BIOS boot process roughly includes stages of SEC, PEI, DXE, and BDS. The method for acquiring a parameter in a Flash Rom in an Intel platform described according to the embodiment mainly includes the following steps. In step 1), values of the OPMENU register and the OPTYPE register are saved, before the OPMENU register and the OPTYPE register are locked at the PEI stage in system booting. In step 2), a command 0x5A for reading a SFDP table is filled into the OPMENU register and the OPTYPE register. In step 3), data of the SFDP table is stored into the built HOB. In step 4), the data in the HOB is stored into an applied EfiACPIMemoryNVS memory at the DXE stage, and 5) the data is read from the EfiACPIMemoryNVS memory by calling the driver in the system, so as to check whether the data is consistent with parameters filled in a program.

FIG. 1 is a flow chart of a method for acquiring a parameter in a Flash Rom in the Intel platform. As shown in FIG. 1, a specific implementing process includes steps 1 to 5.

In step 1, values of the OPMENU register and the OPTYPE register are saved, before the OPMENU register and the OPTYPE register are locked at the PEI stage in booting.

In step 2, the command 0x5A for reading the SFDP table is filled into the OPMENU register and the OPTYPE register.

In step 3, the data of the SFDP table is stored into the built HOB.

In step 4, the values of the OPMENU register and the OPTYPE register are restored, and the OPMENU register and the OPTYPE register are locked.

In step 5, the data in the HOB is stored into the applied EfiACPIMemoryNVS memory at the DXE stage.

In step 6, a software program and a driver are written at an OS side, to read the data of the SFDP table from the EfiACPIMemoryNVS memory.

At the PEI stage after the system is powered on, the OPMENU register and the OPTYPE register of the PCH (namely, a South Bridge) are filled with default values, and the values in the two registers are saved before the registers are locked. Then, the command 0x5A for reading the SFDP table is filled into the OPMENU register and the OPTYPE register. After reading the data of the SFDP table, the data is stored into the built HOB. Then, previous values the OPMENU register and the OPTYPE register are restored. In a subsequent BIOS program, the OPMENU register and the OPTYPE register are locked, so as to prevent a following BIOS program and an OS program from changing the two registers. Finally, the data in the HOB (SFDP table data) is stored in the EfiACPIMemoryNVS type of memory at the DXE stage. Thereby, the data can be acquired at the application layer by calling the driver in the system, so as to check whether the data is consistent with the parameters filled in the program.

The aforementioned specific embodiments are only specific examples of the present disclosure, and the scope of the patent protection of the present disclosure includes, but is not limited to, the aforementioned specific embodiments. What conforms to claims of the present disclosure, or appropriate modification or replacement thereof made by those skilled in the art, should all fall within the scope of the patent protection of the present disclosure.

The invention claimed is:

1. A method for acquiring a parameter in a Flash Rom in an Intel platform, comprising:
   1) saving, at a PEI stage in booting and before an OPMENU register and an OPTYPE registers are locked, values of the OPMENU register and the OPTYPE register;
   2) filling a command 0x5A for reading a SFDP table into the OPMENU register and the OPTYPE register;
   3) storing data of the SFDP table in a built HOB;
   4) storing, at a DXE stage, data in the HOB into an applied EfiACPIMemoryNVS memory; and
   5) reading, by calling a driver in a system, the data from the EfiACPIMemoryNVS memory.

2. The method for acquiring a parameter in a Flash Rom in an Intel platform according to claim 1, wherein after storing the data of the SFDP table in the built HOB, the method further comprises:
   restoring the values of the OPMENU register and the OPTYPE register, and
   locking the OPMENU register and the OPTYPE register.

3. The method for acquiring a parameter in a Flash Rom in an Intel platform according to claim 2, further comprising:
   writing a software program and the driver at an OS side, wherein the driver is called to acquire the data of the SFDP table at an application layer.

* * * * *